May 12, 1959  H. S. RALPH ET AL  2,886,213
FLUID FLOW APPARATUS
Filed April 25, 1957
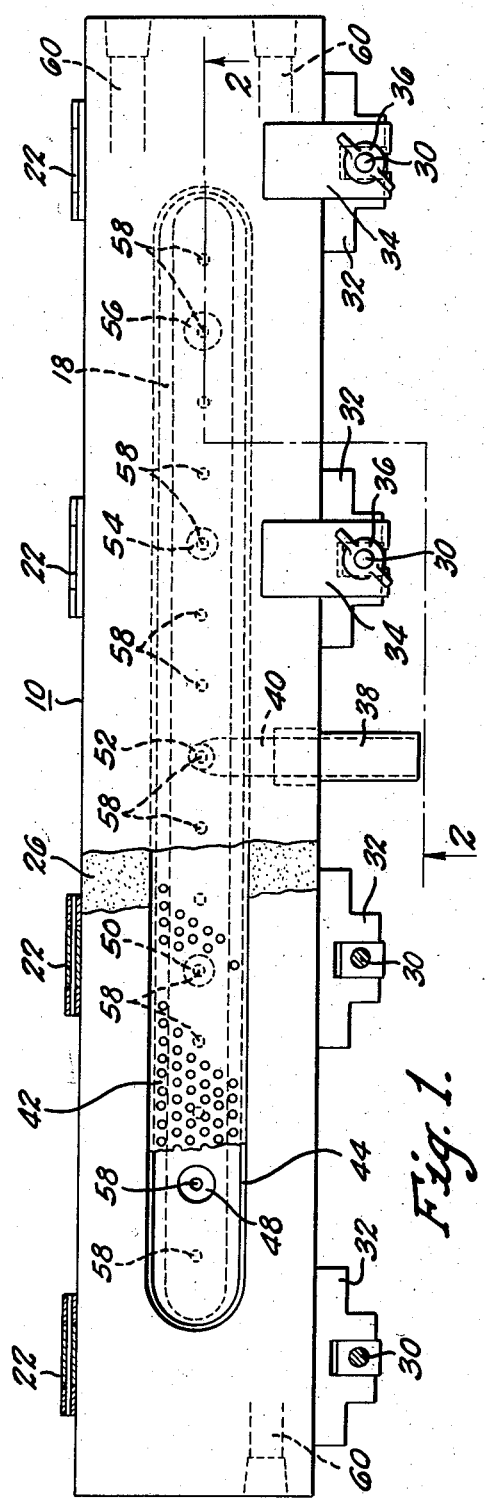
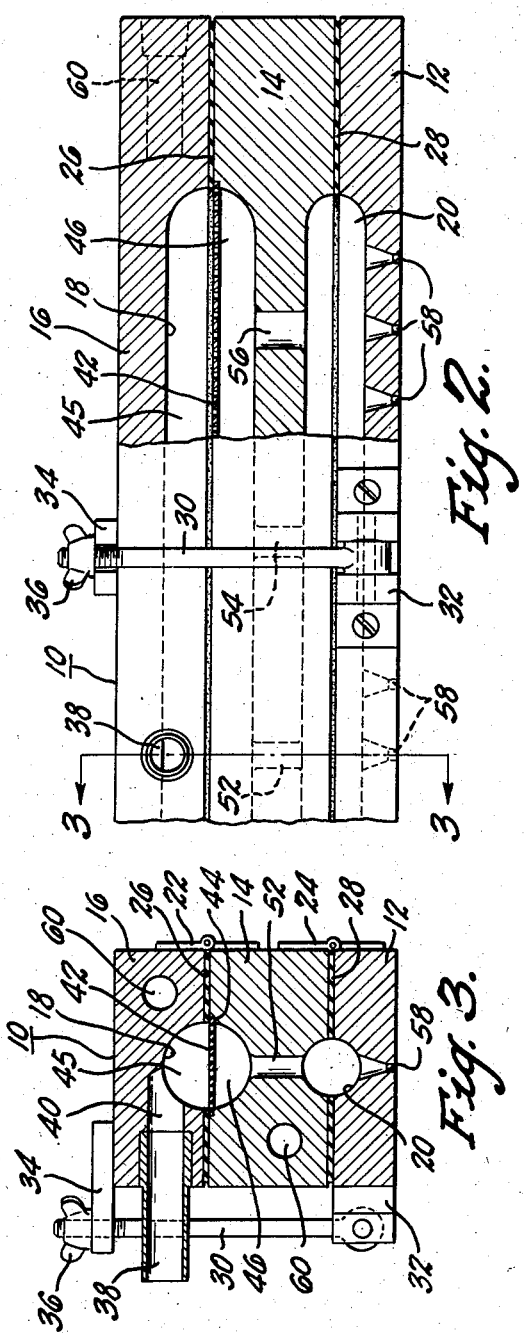
INVENTORS
HERMAN S. RALPH
URBAN P. NELLIS
WILLIAM L. PEARSON
THEIR ATTORNEY

United States Patent Office 2,886,213
Patented May 12, 1959

2,886,213

FLUID FLOW APPARATUS

Herman S. Ralph, Urban P. Nellis, and William L. Pearson, Dayton, Ohio, assignors to General Motors Corporation, Detroit, Mich., a corporation of Delaware Application April 25, 1957, Serial No. 655,051

6 Claims. (Cl. 222—189)

This invention relates to the manufacture of molded articles from sensitized latex foam and in particular to manifold apparatus for simultaneously and uniformly distributing the sensitized latex foam from a continuous mixing or foaming apparatus to a plurality of mold units.

In the manufacture of articles from latex foam it is usual practice to foam the latex by beating or working the latex by means of suitable apparatus, as for example the Oakes continuous automatic mixer manufactured by the American Machine and Foundry Co. which is widely used in the industry, to a condition of greatly expanded volume from which it is exhausted under considerable pressure. Various compounding ingredients may be added to the latex prior to the beating or during the beating. The foamed latex is sensitized or activated by the addition of a gelling agent, the quantities of the specific gelling agent used causing gellation of the foamed latex in a predetermined time in the order of a few minutes. Prior to the gellation of the foam and subsequent to the addition of the gelling agent, the latex foam is transferred under pressure to molds so that upon gelling the molded material may be cured under suitable conditions to form an article of a spongy and resilient nature. Various suitable latex recipes and gelling agents which may be used are disclosed in the Patents 2,472,055, 2,594,859, and 2,731,427.

In the manufacture of certain foam rubber articles as for example weather strips for automobile doors and the like, it is advantageous to mold the strips continuously by means of apparatus such as for example is disclosed in the Harris S.N. 535,136 filed September 19, 1955, and assigned to the assignee of the present invention, but now abandoned. Since the quantities of foamed latex used to mold a weather strip is relatively small, it is practical and advantageous to operate a plurality of mold apparatus units simultaneously to which sensitized foam latex is fed simultaneously from a single continuous foaming apparatus unit. The problem of distributing the gellable latex from a single source to a plurality of molds under conditions wherein uniform quantities of the foam of uniform density are fed to a plurality of molds is complicated by the fact that the foam is a compressible fluid.

It is an object of the present invention to provide means for receiving a compressible fluid under pressure from a single source and discharging the fluid in a plurality of streams at a substantially uniform rate and density and more specifically to provide a manifold apparatus for distributing foam from the exhaust of a latex foam producing apparatus to a plurality of mold devices under conditions wherein the foam is fed into each mold device at a substantially uniform rate and density. These and other objects are accomplished by providing a manifold which comprises first and second longitudinally extending chambers in spaced parallel relation. The first chamber is provided with a foam intake conduit means having an intake opening preferably located at the top of the chamber and centrally of its length. The second chamber is connected to the first chamber by a plurality of conduits or leaders positioned transversely along the length of the chamber in a predetermined spaced relation, the conduits on either side of a transverse plane of the chamber passing through the foam intake opening being progressively larger toward the extremities of the chambers whereby the foam is distributed along the length of the second conduit at a substantially uniform pressure and density. A plurality of nozzles of uniform size are provided in the second chamber which are disposed along its length in a uniformly spaced relation for dispensing foam to individual mold apparatus units at a uniform rate and density. The first chamber is longitudinally divided by a perforated plate separating the foam intake opening from the conduits connecting the two chambers. The openings in the perforated plate are of a predetermined size whereby it holds back or screens particles of foam which may have gelled prematurely, and it distributes the foam along its length. To facilitate cleaning of the manifold, it is advantageously made in three readily assembled and dismantled sandwich-like sections, the parting plane between the intermediate and one outside section being across the longitudinal length of the first chamber and in the plane of its dividing perforated plate, and the parting plate between the intermediate and the other outside section being across the longitudinal length of the second chamber whereby the surfaces of the chambers are exposed when the manifold sections are opened. To prevent premature gelling of the foam within the manifold wall, cooling fluid conduits are provided in the manifold walls whereby the manifold may be maintained at a predetermined temperature.

Further objects and advantages of the present invention will be apparent from the following description, reference being had to the accompanying drawings wherein preferred embodiments of the invention are clearly shown.

In the drawings:

Figure 1 is a top view in partial cross section of a manifold embodying the present invention.

Figure 2 is an elevation view in partial cross section of the apparatus shown in Figure 1.

Figure 3 is a cross sectional view taken along line 3—3 of Figure 2.

Referring now to the drawings and in particular to Figure 3, the foam distributing manifold is in the form of an elongated housing or block 10 of rectangular cross sectional shape consisting of a base section 12, an intermediate section 14 and a top section 16. The housing 10 includes an upper elongated cylindrical cavity or chamber 18 terminating in semi-spherical ends, the upper half of which is disposed within the upper block section 16 and the lower half of which is disposed within intermediate section 14. A second longitudinally extending cylindrical chamber 20 terminating in semi-spherical ends, is provided within the block 10 which is aligned with chamber 18 in a vertical plane and is parallelly spaced therefrom. The upper half of the chamber 20 is disposed within the intermediate block 14 and the lower half is disposed within the lower or base block portion 12.

The upper and intermediate block sections 14 and 16 respectively, are connected by a plurality of hinges 22 and the base and intermediate block sections 12 and 14 respectively, are connected by a plurality of hinges 24 vertically aligned with the hinges 22 whereby the block sections may readily be moved away from each other in an obvious manner to completely expose the chambers 18 and 20 and thereby permit the chamber passages to be efficiently cleaned. Gaskets or seals 26 and 28 are provided between the planar surfaces of the block sections 16 and 14, and 12 and 14, respectively. Clamp means for holding the block sections tightly in a sealed relation are provided in opposed relation to the hinges 22 and 24 in the form of bolts 30 pivotally connected to brackets 32 attached to the base section 12, which are received in slots of brackets 34 attached to the top block section 16, and are secured thereto by means of wing nuts 36 in an obvious manner.

The upper chamber 18 is provided with a single inlet conduit 38 adapted to be connected to the exhaust of a foam producing apparatus (not shown) as for example by a hose or other suitable conduit means. The inlet conduit 38 leads to an inlet opening 40 preferably located midway of the chamber 18 and at the top thereof. A perforated plate 42 seated on shoulders 44 provided in the intermediate section 14 of the block, longitudinally divides the chamber 18 into approximately equal upper portion 45 and the lower portion 46. The basic purpose of the plate 42 is to screen out particles of prematurely gelled foam. However it has been found that if the openings of the plate 42 are made of an optimum size in view of the size of the manifold unit, the viscosity of the foam and the operating pressure, the plate 42 operates to distribute the foam along its length and into the lower portion 46 of the chamber 18 without substantially impeding the flow of foam therethrough or causing an inordinate pressure drop therealong.

Connecting the chambers 18 and 20 are a plurality of conduits or leaders 48, 50, 52, 54 and 56 disposed within the intermediate block section 14 in a vertical plane and in a predetermined space relation along the lengths of the chambers. The central conduit 52 as shown in Figure 3 is of a predetermined size or diameter, and is located beneath the inlet opening 40. Each of the conduits toward the extremities of the chambers are progressively larger. Thus the conduits 50 and 54 are of equal size and are larger than the conduit 52 and the conduits 48 and 56 are of equal size and are larger than the conduits 50 and 54, respectively. Leading from the base of the lower chamber 20 are a plurality of nozzles 58 which are of equal size and are equally spaced along the length of the chamber 20. To prevent premature coagulation, the manifold block is provided with passages 60 whereby a cooling fluid such as refrigerated water may be circulated to operate the manifold at a predetermined temperature.

As aforementioned, a specific object of the invention is to pass latex foam from a foam producing apparatus, which may operate at pressures ranging from 10 to 80 pound gauge, to a plurality of mold units wherein the pressure of the foam is substantially 0 gauge, under conditions such that foam of substantially uniform density is deposited in each mold at a substantially uniform rate. In a specific example a foam producing apparatus may operate at about 12 pound gauge, and a pressure drop of approximately 12 pounds is involved in the passage of the foam from the foam producing unit through the manifold of the present invention and into the molds. As the foam is deposited through the opening 40 into the upper compartment 45 of chamber 18 and flows toward the extremities of this compartment and through the plate 42, a progressively increasing pressure drop occurs toward the extremities of the chamber 18 with the result that the volume of the foam toward the extremities of the chamber is progressively increased a greater amount than centrally of the chamber with a corresponding inverse variation in the density of the foam in accordance with Bernoulli's theorem. However in accordance with Bernoulli's theorem, as the foam passes through the conduits 48—56 into the lower chamber 20, the pressure drop through the smaller conduits is greater than through the larger conduits with the result that the pressure and the density of the foam is substantially equalized within the lower chamber 20, and the nozzles feed the foam into mold units at a uniform rate and density to substantially 0 pressure.

The lower chamber 20 is preferably of smaller diameter than the upper chamber 18 to insure that the former is substantially filled with foam and provides the nozzles with foam at a constant pressure and density and is of substantially the same length. The cylindrical configuration of the chambers and the semi-spherical ends thereof enable the foam to efficiently flow through the manifold without developing stagnant pockets which may coagulate prematurely.

A specific embodiment of the present invention shown in the drawings designed for use in connection with foam producing apparatus exhausted about 10 to 12 pound pressure gauge at about 65° F. and having a viscosity of from 1,000 to 5,000 centipoise, involves chamber 18 having a radius of about ¾ of an inch and the chamber 20 having a radius of about ½ inch. The nozzles 58 have throat openings of about ⅛ of an inch and are spaced about 1.2 inches apart. The central conduit or leader 52 has a radius of about ¼ inch and the conduits 50 and 48 have a radii of about 5/16 and ⅜ inch respectively, the conduits being equally spaced a distance of about 3.6 inches from their centers. The perforated plate 42 has openings of about ⅛ inch with metal segments of about 1/16 inch on a line passing through the centers of adjacent openings. The specific dimensions and number of leaders or conduits between the chambers are selected so as to provide pressure and density equalization through the manifold. It is to be understood that these dimensions are representative of a manifold for operation under the conditions described. The dimensions will of course vary depending on the size of the manifold and the viscosity and pressure of the foam.

While the embodiments of the present invention as herein disclosed constitutes a preferred form, it is to be understood that other forms may be adopted.

What is claimed is as follows:

1. A manifold apparatus for receiving a compressible fluid under pressure and discharging the fluid from a plurality of nozzles at a substantially uniform rate and density, comprising a first longitudinal extending chamber and a second longitudinal extending chamber spaced perpendicularly from said first chamber, inlet means for admitting fluid under pressure to said first chamber, a plurality of longitudinally spaced conduits connecting said chambers in fluid flow relation, said conduits being of progressively larger diameter in directions away from said fluid admission means, and a plurality of uniformly sized exhaust nozzles connected to said second chamber.

2. Manifold apparatus for receiving sensitized latex foam under pressure and discharging the foam to a plurality of molds at a substantially uniform rate and density, comprising a first cylindrical longitudinal extending chamber and a second cylindrical longitudinal extending chamber aligned with said first chamber in parallelly spaced relation, inlet means for admitting foam under pressure located centrally of the longitudinal length of said first chamber, a plurality of longitudinally spaced conduits perpendicularly connecting said chambers in fluid flow relation, said conduits being progressively larger diameter in longitudinal directions away from the central portion of said chambers, and a plurality of uniformly sized exhaust nozzles connected to said second chamber for depositing the foam into said molds.

3. Manifold apparatus for receiving sensitized latex foam under pressure and discharging the foam to a plurality of molds at a substantially uniform rate and density comprising a first cylindrical longitudinally extending chamber, a perforated plate dividing said chamber in a longitudinal plane into upper and lower compartments, inlet means for admitting foam under pressure to the top of said upper compartment centrally of its length, a second cylindrical longitudinally extending chamber aligned with said first chamber in parallelly spaced relation, a plurality of spaced conduits perpendicularly connecting said chambers in fluid flow relation, said conduits being progressively larger in the longitudinal direction away from the central portion of said chambers, and a plurality of uniformly sized exhaust nozzles connected to said second chamber for depositing foam into said molds.

4. Manifold apparatus for receiving sensitized latex foam under pressure and discharging the foam to a plurality of molds at a substantially uniform rate and density, comprising a first cylindrical longitudinally extending chamber having semi-spherical end portions, a perforated plate dividing said chamber in a longitudinal plane into upper and lower compartments, inlet means for admitting foam under pressure to the top of said upper compartment centrally of its length, a second cylindrical longitudinally extending chamber having semispherical end portions aligned with said first chamber in parallelly spaced relation, said second chamber being of approximately the same length as said first chamber, a plurality of spaced conduits perpendicularly connecting said chambers in fluid flow relation, said conduits being progressively larger in a longitudinal direction away from the central portion of said chambers and a plurality of uniformly sized exhaust nozzles uniformly spaced along the length of said second chamber and connected to said second chamber for depositing foam into said molds.

5. Manifold apparatus for receiving sensitized latex foam under pressure and discharging the foam into a plurality of molds at a substantially uniform rate and density, comprising a housing including an upper section an intermediate section, and a lower section, a first cylindrical longitudinally extending chamber disposed partly within said upper section and partly within said intermediate section, foam inlet means disposed in said upper section for admitting foam under pressure to said first chamber, a second cylindrical longitudinally extending chamber disposed partly within said intermediate section and partly within said lower section, a plurality of spaced conduits within said intermediate section perpendicularly connecting said chambers in fluid flow relation, said conduits being progressively larger in a longitudinal direction away from the ends of said foam inlet means, a plurality of nozzles of uniform size uniformly spaced along the length of said second chamber associated with said lower section for depositing foam into said molds, means for sealing said sections with respect to each other and removable means for holding said sections in sealed relation.

6. Manifold apparatus for receiving sensitized latex foam under pressure and discharging the foam into a plurality of molds at a substantially uniform rate and density, comprising a housing including upper, intermediate, and lower sections in sandwich relation, a first cylindrical longitudinally extending chamber disposed partly within said upper section and partly within said intermediate section, a perforated plate disposed between said upper and intermediate sections dividing said first chamber into upper and lower compartments, foam inlet means disposed in said upper section centrally of said first chamber for admitting foam to said upper compartment, a second cylindrical longitudinally extending chamber disposed partly within said intermediate section and partly within said lower section, a plurality of spaced conduits within said intermediate section in spaced relation perpendicularly connecting said chambers in fluid flow relationship, said conduits being progressively larger in a longitudinal direction away from the location of said foam inlet means, a plurality of nozzles of uniform size uniformly spaced along the length of second chamber associated with said lower section for depositing foam into said molds, gasket means for sealing said sections with respect to each other and removable clamp means for holding said sections in sealed relationship.

References Cited in the file of this patent

UNITED STATES PATENTS

| 2,766,479 | Henning | Oct. 16, 1956 |
| 2,771,636 | McIntosh et al. | Nov. 27, 1956 |